United States Patent Office 3,229,288
Patented Jan. 11, 1966

3,229,288
RADAR RANGE EXTENSION SYSTEM
William A. Massey, Pensacola, Fla., assignor to the United States of America as represented by the Secretary of the Air Force
Filed Feb. 20, 1964, Ser. No. 346,362
1 Claim. (Cl. 343—17.1)

This invention relates to radar type pulse transmitting and receiving systems and, more particularly, to the problem of extending the operating range of such systems.

One problem in radar or in any system that transmits a pulse of energy periodically to determine the range of a target by measuring the time between the transmission of the pulse and the reception of the reply or reflected energy, is that at certain ranges the reply returns at the instant a new pulse is being transmitted. This occurs when the range is such that the time required for the energy to reach the target and return is the same as, or an integral multiple of, the period at which pulses are transmitted.

Obviously, one solution to the problem of tracking at such a range is to shift the pulse repetition frequency enough so that return and a new transmitted pulse do not coincide. However, it is impractical to increase or decrease the pulse repetition frequency indefinitely because some shifts in the pulse repetition frequency may cause a momentary loss of track while the range machine is slewed in or out in range. Another disadvantage of shifting the pulse repetition frequency is that it complicates problem for synchronizing or phasing radars to avoid mutual interference. The present invention offers a system of extending radar range without the above-mentioned disadvantages.

Therefore, an object of this invention is to provide in a radar system, novel methods and means for receiving a radar signal without interference from a transmitted signal.

More specifically, an object of this invention is to provide for a system for receiving a radar signal without interferences from a transmitted signal which does not require the varying of the pulse repetition frequency.

Figure 1:
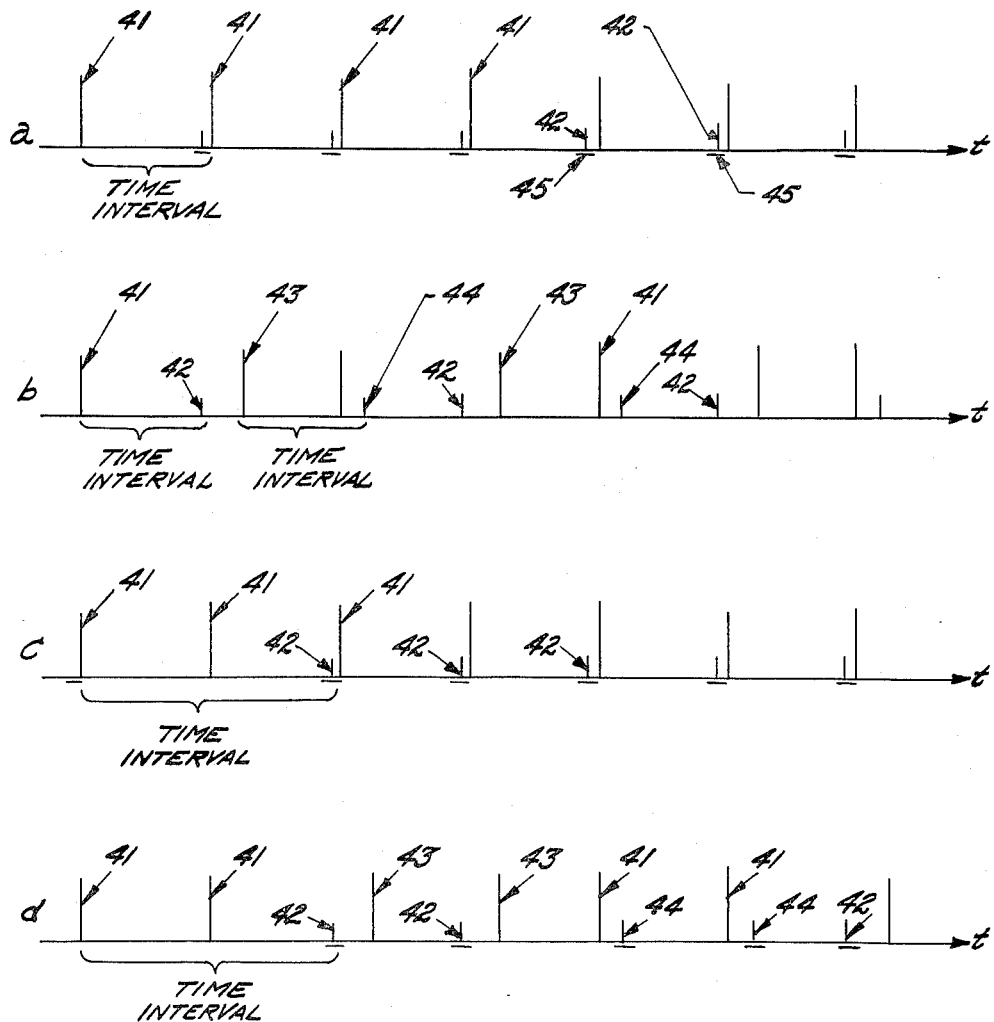
Figure 2:
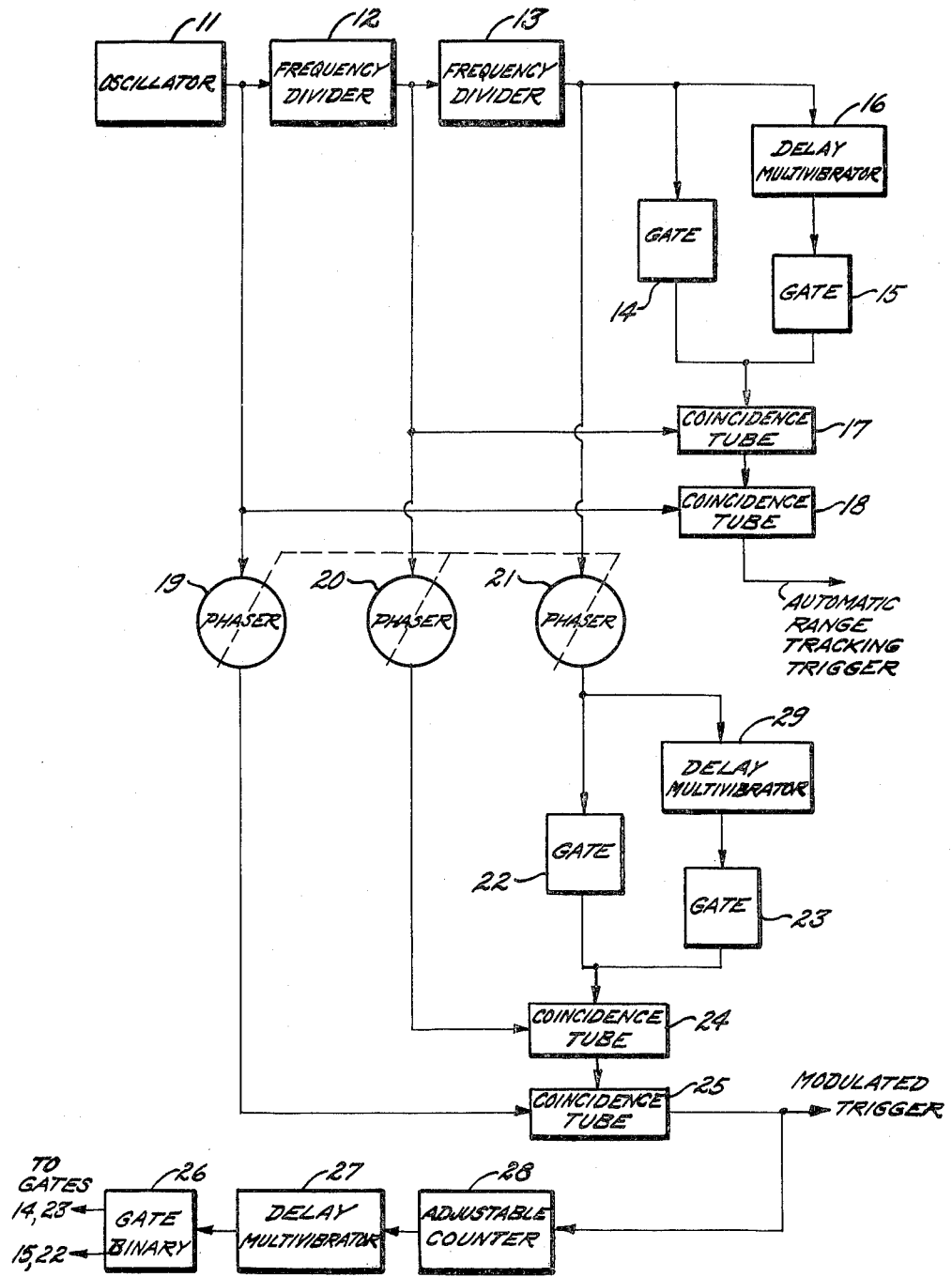

Other objects and features of this invention will become more apparent by reference to the following description when taken in conjunction with the accompanying drawings in which:

FIG. 1 shows a series of related pulse diagrams that are helpful to an understanding of the mode of operation of the invention; and FIG. 2 is a block diagram of the components involved in the herein-exemplified embodiment of my invention.

By way of general statement as to the mode of operation of the invention, it may be said that the invention embraces the concept of controlling of radar pulses by displacing some of the transmitted pulses from their normal position to avoid coincidence with the returned pulses without changing the average pulse repetition frequency.

FIG. 1a shows a situation that may occur with a conventional radar where returned pulses 42 are about to coincide with transmitted pulses 41. Near coincidence, the track of the target would be lost. To avoid this we can displace the pulses as shown in FIG. 1b. Every other transmitted pulse is displaced from its normal position which prevents coincidence of the transmitted pulses and the returned pulses. The time between a transmitted pulse and its returned pulse remains the same since it is determined only by the distance from the transmitter to the target and the velocity of electromagnetic waves.

For the radar to track satisfactorily it is necessary that track gates 42 and the reception of returned pulses 41 and 43 coincide. This can be accomplished by having track gate 45 on time, if the returned pulse originated from an "on time" transmitted pulse; but if the returned pulse originated from a delayed transmitted pulse, the track gate would have to be delayed an amount equal to the delay of the transmitted pulse.

As can be seen in FIG. 1b, an additional distance can be tracked which is roughly equal to the distance that the displaced transmitted pulses 43 are shifted. As the distance is increased, returns 42 from undelayed transmitted pulses 41 begin to run into displaced transmitted pulses 43. The normal mode of operation can again be used and returned pulses 42 will not coincide with transmitted pulses 41 begin to run into displaced transmitted pulses ner until the range is such that the time from a transmitted pulse 41 to its return 42 approaches two times a pulse repetition period as shown in FIG. 1. At this time, it will be necessary to resort to pulse displacement again. To avoid coincidence this time, the pulses must be displaced in groups of two. That is, two transmitted pulses 41 should be on time and two transmitted pulses 43 should be displaced as shown in FIG. 1d. The track gates 45 must be similarly displaced.

After the range has increased to where there would be no coincidence of successive undelayed transmitted pulses 41 with returned pulses 42, the radar can again return to normal operation.

This procedure can be repeated at successively greater ranges. The pulses should be displaced in groups corresponding to which transmitted pulse is being tracked through. That is, on the first time through there would be groups of one, second time through, groups of two, etc.

It may be possible to effect some simplification in circuitry by using the smaller pulse groups when one is tracking through later transmitted pulses.

Referring to FIG. 2, the output of 82 kc. oscillator 11 is divided by frequency divider 12 by a factor of 20 to produce 4.1 kc. which is then divided by frequency divider 13 by a factor of 10 to produce 410 c.p.s. The 410 c.p.s. is channeled into gate 14 and gate 15, with gate 15 preceded by delay multivibrator 16. The output of gates 14 and 15 is compared with the output of frequency divider 12 by coincidence circuit 17. The output of coincidence circuit 17 is compared with the output of oscillator 11 or 82 kc. by coincidence circuit 18 which results in the automatic range tracking trigger. If the returned pulses coincide or are about to coincide with the transmitted pulses, the transmitted pulses can be delayed by changing the phase of the 82 kc., 4.1 kc., and 410 c.p.s. in unison by phasers 19, 20, 21 respectively. The phased 410 c.p.s. is channeled into gate 22 and gate 23, with gate 23 preceded by delay multivibrator 29. The output of gates 22 and 23 is compared with the phased 4.1 kc. by coincidence circuit 24. The output of coincidence circuit 24 is compared with the phased 82 kc. at coincidence circuit 25 which results in the modulated trigger.

Gates 14, 15, 22, and 23 are controlled by gate binary 26 which is controlled by pulses coming from adjustable counter 28 that counts pulses from the output of coincidence circuit 25. Delay multivibrator 27 is interposed between gate binary 26 and adjustable counter 28.

The invention works in the following manner. Assume delay multivibrators 16 and 29, that precede gates 15 and 23, introduce enough delay so that coincidence circuits 17 and 24 would have an output of a 4.1 kc. pulse one 4.1 kc. period later. Also assume that gate binary 27 is in the state that opens gates 14 and 23. With gate 14 open, coincidence circuit 17, in the automatic range tracking trigger chain, will have a 4.1 kc. pulse output at the normal time and, therefore, the trigger will be on time. With gate 23 open, coincidence circuit 24, in the phased or modulated chain, would receive a delayed 410 c.p.s. frequency causing the output of coincidence circuit 24 to be delayed one 4.1 kc. period and the modulated trigger would be one 4.1 kc. period late. Gate binary 26 is controlled by delayed pulses from adjustable counter 28. The pulses are delayed by delay multivibrator 27 to prevent gate binary 26 from changing state in the vicinity of the track gate or modulated trigger. After a predetermined number of modulated trigger pulses, adjustable counter 28 generates a pulse to change the state of gate binary 26 causing the gates in the trigger chains to reverse their positions to delay the automatic range tracking trigger and to make the modulated trigger on time. The number of pulses transmitted without change, depends on the setting of adjustable counter 28 which is set according to which transmitted pulse is near coincidence with a returned pulse.

What is claimed is:

In a radar system, an apparatus for extending range by displacing predetermined transmitted pulses without changing the average pulse repetition frequency, said apparatus comprising: an oscillator; a first frequency divider coupled to said oscillator; a second frequency divider coupled to said first frequency divider; a first pair of gates each being coupled to said second frequency divider and one of said pair of gates having a controlled delay input; a first coincidence circuit having inputs from said first pair of gates and said first frequency divider; a second coincidence circuit having inputs from said first coincidence circuit and said oscillator; a first phaser coupled to said oscillator; a second phaser coupled to said first frequency divider; a third phaser coupled to said second frequency divider, and with said first phaser, said second phaser and said third phaser being ganged to vary the phase outputs of said oscillator, said first frequency divider, and second frequency divider simultaneously; a second pair of gates each bein coupled to said third phaser and one of said pair of gates having a controlled delay input; a third coincidence circuit having inputs from said second pair of gates and said second phaser; a fourth coincidence circuit coupled to said first phaser and said third coincidence circuit, the output of said second coincidence circuit and said fourth coincidence circuit being selectively utilized; means for controlling said gates, said means adapted to receive input signals from said fourth coincidence circuit.

References Cited by the Examiner

UNITED STATES PATENTS

| | | | |
|---|---|---|---|
| 3,023,409 | 2/1962 | Smith | 343—13 |
| 3,066,288 | 11/1962 | Vogtmann | 343—7.7 |
| 3,147,476 | 9/1964 | Stodola | 343—7.3 |
| 3,155,973 | 11/1964 | Smith | 343—17.1 |

LEWIS H. MYERS, *Primary Examiner.*

CHESTER L. JUSTUS, *Examiner.*

R. D. BENNETT, *Assistant Examiner.*